US005794122A

United States Patent [19]

Sugai et al.

[11] Patent Number: 5,794,122

[45] Date of Patent: Aug. 11, 1998

[54] RADIO SELECTIVE CALL RECEIVER WITH SENTENCE MEMORY

[75] Inventors: Takefumi Sugai, Natori; Shuichi Ninomiya, Hirakata, both of Japan

[73] Assignee: Matsushita Electric Industrial Co., Ltd., Osaka, Japan

[21] Appl. No.: 782,586

[22] Filed: Jan. 13, 1997

[30] Foreign Application Priority Data

Jan. 12, 1996 [JP] Japan .................................... 8-003548

[51] Int. Cl.[6] .................................... H04B 7/00

[52] U.S. Cl. .................... 455/38.1; 455/136.1; 455/418; 455/567; 455/38.4; 340/825.44; 340/825.22

[58] Field of Search .................................... 455/38.1, 38.2, 455/38.4, 38.5, 145, 186.1, 154.1, 422, 426, 458, 466, 517, 524, 550, 566, 567, 575, 100, 114–115, 117, 121, 31.2, 418, 419, 420; 340/825.44, 825.22, 311.1; 379/102, 31.3

[56] References Cited

U.S. PATENT DOCUMENTS

| | | | |
|---|---|---|---|
| 5,066,949 | 11/1991 | Breeden et al. | 340/311.1 |
| 5,430,439 | 7/1995 | Bodet et al. | 340/825.44 |
| 5,561,702 | 10/1996 | Lipp et al. | 340/825.44 |
| 5,574,439 | 11/1996 | Miyashita | 455/38.1 |
| 5,652,572 | 7/1997 | Kido et al. | 340/825.44 |

*Primary Examiner*—Reinhard J. Eisenzopf
*Assistant Examiner*—Doris To
*Attorney, Agent, or Firm*—Ratner & Prestia

[57] ABSTRACT

A radio selective call receiver allowing the user to assign a fixed sentence to arbitrary information or to add and use the arbitrarily set fixed sentence thereafter. The radio selective call receiver receives and demodulates fixed sentence data modulated and transmitted by a radio selective call base station, and stores the data as a fixed sentence. The receiver comprises: a receiver unit for receiving and demodulating fixed sentence number and fixed sentence data, a fixed sentence memory unit for storing fixed sentence data together with fixed sentence number, a data judging unit for determining whether to write or read a fixed sentence from the received information, a fixed sentence writing unit for writing the received fixed sentence data at a position indicated by the received fixed sentence number in the fixed sentence memory unit when judged to be writing by the data judging unit, and a fixed sentence reading unit for reading the stored fixed sentence data from the position indicated by the fixed sentence number received in the fixed sentence memory unit when determined to be a reading by the data judging unit.

6 Claims, 5 Drawing Sheets

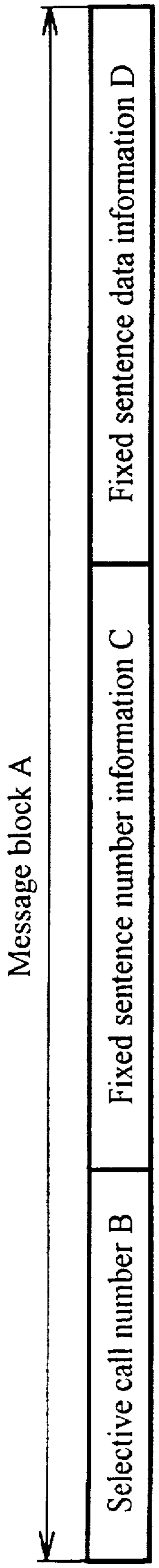
FIG. 2
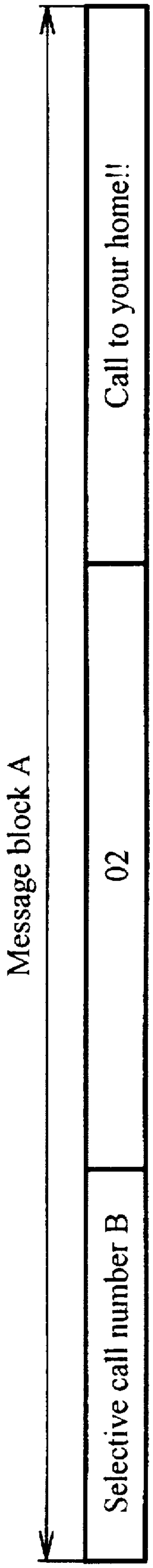
FIG. 3
| Fixed sentence number | Fixed sentence data |
|---|---|
| 01 | Call to your office!! |
| 02 | Call to your home!! |
| 03 | Call to West side office!! |
| 04 | |
FIG. 4

RADIO SELECTIVE CALL RECEIVER WITH SENTENCE MEMORY

BACKGROUND OF THE INVENTION

The present invention relates to a radio selective call receiver for receiving and storing the content and fixed sentence number of a fixed sentence transmitted from a radio selective call base station.

Recently, the radio selective call receiver which has called the pager receiver is realized in various systems, including the radio selective pager receiver capable of using fixed sentences for saving power consumption and traffic, which is now in the main stream of radio selective call receivers. The conventional radio selective pager receiver is described below.

A radio selective call base station which is called a pager base station modulates and transmits a call number and message data. The pager receiver receives and demodulates the modulated and transmitted signal, and compares the call number taken from the demodulated signal and the call number of the pager receiver stored initially, and stores the message data when both call numbers coincide with each other, and calls the user by indicator or buzzer sound.

The operation of the conventional radio selective pager receiver is described below. FIG. 9 is a block diagram showing an entire constitution of a conventional pager receiver. In the diagram, the pager receiver is composed of a receiving means 1, a call number memory means 2, a call number collating means 3, a message acquisition switch 4, a data judging means 5, a fixed sentence reading means 6, a fixed sentence memory means 7, a notice means 8, a received data writing means 9, and a received data memory means 10. FIG. 6 is a simplified diagram of a signal format of a character message call transmitted from the pager base station for a conventional pager receiver. FIG. 8 is a simplified diagram of a signal format of fixed sentence call transmitted from the pager base station for a conventional pager receiver.

The receiving means 1 receives the signal modulated and transmitted from the pager base station, and delivers the demodulated data into the call number collating means 3. The data is also delivered to the message acquisition switch 4 in an invalid state (open state). Consequently, the call number collating means 3 compares and collates the call number initially stored in the call number memory means 2 and the selective call number B shown in FIG. 6 or FIG. 8, and when the call numbers are identical, delivers a valid signal to the message acquisition switch 4. The demodulated data is delivered to the data judging means 5 through the message acquisition switch 4 which is now in a valid state. The data judging means 5 judges whether the data is fixed sentence number information or character message information. When the data judging means 5 judges the data to be character message information, it delivers the data to the received data writing means 9. The received data writing means 9 writes the received character message information into the received data memory means 10 and further notifies the notice means 8.

On the other hand, when the data judging means 5 judges the data to be fixed sentence number information, the fixed sentence reading means 6 reads the initially stored fixed sentence number and fixed sentence message from the fixed sentence memory means 7. The fixed sentence message is then provided to the notice means 8.

The fixed sentence message initially stored in the fixed sentence memory means 7 was, however, a single fixed sentence message stored initially or a combination of the sentences because it was difficult for the user to set arbitrary sentences.

In particular, as the radio selective pager receiver allowing the use of a combination of fixed sentences, the one disclosed in Japanese Laid-open Patent H2-146828 is known. In this pager receiver, an undefined portion is contained in the fixed sentence, and it is designed to detect it and replace characters by the receiver, and therefore a message of a large quantity of information can be transferred without increasing the transmission time, and flexible response to message is enabled, but the user is not permitted to alter the initially stored fixed sentence freely.

SUMMARY OF THE INVENTION

To solve the problems, a radio selective call receiver of the invention is a receiver which receives and demodulates a selective call number and modulated wave of data accompanied by said selective call number, and displays according to said data when said received selective call number and preset self-selective call number match. The receiver comprises a receiving means for receiving and demodulating at least a selective call number, fixed sentence number information, and fixed sentence data information accompanied with the fixed sentence number information, of the signals modulated and transmitted by a radio selective call base station, a fixed sentence memory means for storing said fixed sentence data information together with said fixed sentence number information, a data judging means for judging whether writing or reading of fixed sentence, or character message information, from the received information, a fixed sentence writing means for writing said received fixed sentence data information at a position indicated by said received fixed sentence number information in said fixed sentence memory means when judged to be a writing of a fixed sentence by said data judging means, and a fixed sentence reading means for reading said stored fixed sentence data information from said fixed sentence memory means at the location indicated by said received fixed sentence number information when judged to be a reading by said data judging means.

This offers the function of allowing the user to alter the fixed sentence to arbitrary information or to add information, and to use the arbitrarily set fixed sentence thereafter.

BRIEF DESCRIPTION OF THE DRAWINGS

FIG. 2 is a simplified diagram of signal format transmitted from radio selective call base station in embodiment 1 of the invention;

FIG. 3 is a diagram showing an example of content of signal format transmitted by the same radio selective call base station;

FIG. 4 is a diagram showing an example of content of fixed sentence memory means in embodiment 1 or 2 of the invention;

DESCRIPTION OF THE PREFERRED EMBODIMENTS

Figure 1:
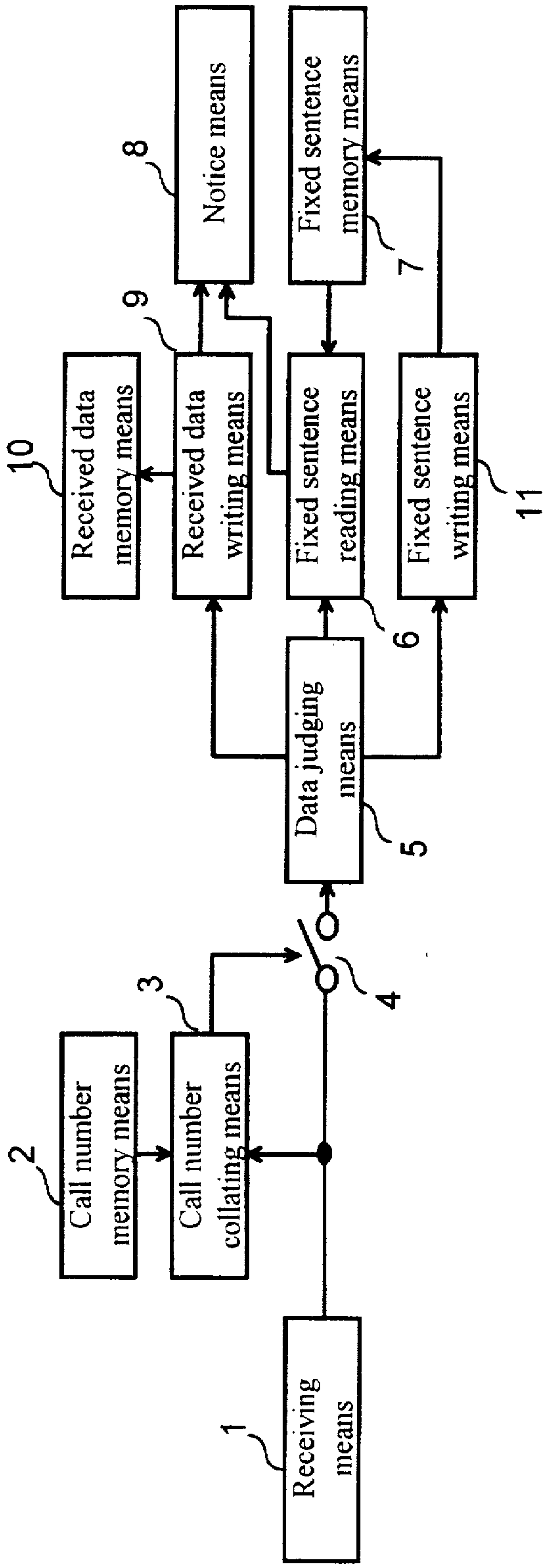
FIG. 1 is a block diagram showing a constitution of a radio selective call receiver in embodiment 1 of the invention.

Referring now to the drawings, embodiments of the invention are described in detail below.

1st EMBODIMENT

FIG. 1 is a block diagram showing a constitution of a radio selective call receiver in embodiment 1 of the invention. FIG. 2 is a simplified diagram of signal format transmitted by a radio selective call base station for the radio selective call receiver of the embodiment. The radio selective call base station modulates and transmits a message block A consisting of selective call number B, fixed sentence number information C and fixed sentence data information D shown in FIG. 2 as one block, or message block A consisting of selective call number B and fixed sentence number information C shown in FIG. 8 as one block.

Figure 9:
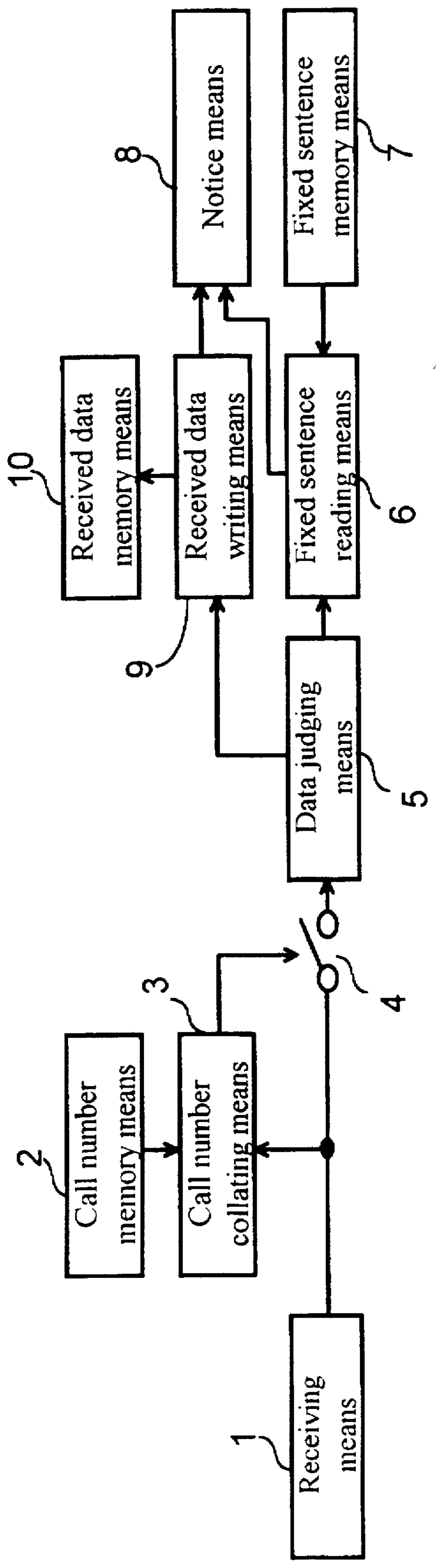
FIG. 9 PRIOR ART
FIG. 9 is a block diagram showing a constitution of a conventional radio selective call receiver.

In the exemplary embodiment of FIG. 1, the same constituent elements as those in the conventional radio selective call receiver shown in FIG. 9 are identified with same reference numerals, and their explanations are omitted.

In FIG. 1, the receiving means 1 receives the signal transmitted by the radio selective call base station (not shown in the figure), and demodulates the content of the message block A so as to be recognized in each block. The data received and demodulated in the receiving means 1 is issued into call number collating means 3. The data is also issued into a message acquisition switch 4 which is in an invalid state (open state). The call number collating means 3 compares and collates the selective call number B of the demodulated data and the call number initially stored in the call number memory means 2, and when both numbers match, the message acquisition switch 4 is made valid (closed)), so that demodulated data may be fed into the data judging means 5 through the message acquisition switch 4. The data judging means 5 judges whether to read or write the fixed sentence by the presence or absence of fixed sentence data information D shown in FIG. 2. When it is determined to be fixed sentence writing, the fixed sentence data information is written into a specified position of the fixed sentence memory means 7 by the fixed sentence writing means 11.

For example, when the fixed sentence number information C shown in FIG. 3 transmitted from the radio selective call base station is "02" and the fixed sentence data information is "Call to your home!!", the radio selective call receiver receives this message block judged as a fixed sentence written by the data judging means 5, and delivers the received data to the fixed sentence writing means 11. The fixed sentence writing means 11 writes the received fixed sentence data information "Call to your home!!" into the fixed sentence memory means 7 which corresponds to position 02 in the received fixed sentence number information shown in FIG. 4.

Figure 8:
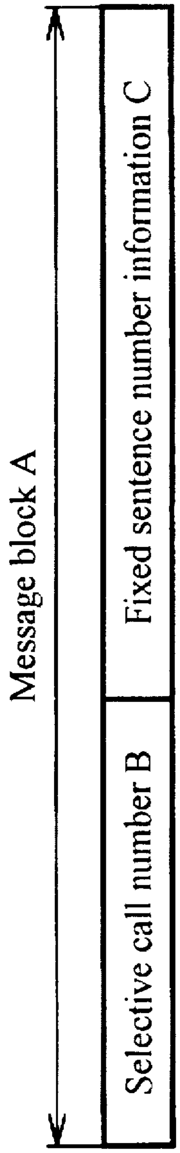
FIG. 8 PRIOR ART
FIG. 8 is a simplified diagram of signal format transmitted by the same radio selective call base station.

On the other hand, when the radio selective call receiver receives the signal of the same message block as in the prior art shown in FIG. 8 transmitted by the radio selective call base station, the data judging means 5 judges the signal to be a fixed sentence because it is a message block without fixed sentence data information. The fixed sentence reading means 6 reads out the fixed sentence data information from the position indicated by the fixed sentence number information of the fixed sentence memory means 7, and displays it in notice means 8.

Thus, according to the embodiment, arbitrary fixed sentence information can be written into the fixed sentence memory means 7 by the fixed sentence writing means 11, and the written fixed sentence information can be read out by the fixed sentence reading means 6 similar to the conventional fixed sentence, so that the user can add a new fixed sentence.

In the description of the embodiment, it is explained that the data judging means 5 judges reading or writing of the fixed sentence memory means 7 by the presence or absence of fixed sentence data information. It may also be possible, however, to set the judging information of whether to write or read in the message block and judge according to this judging information.

2nd EMBODIMENT

Figure 5:
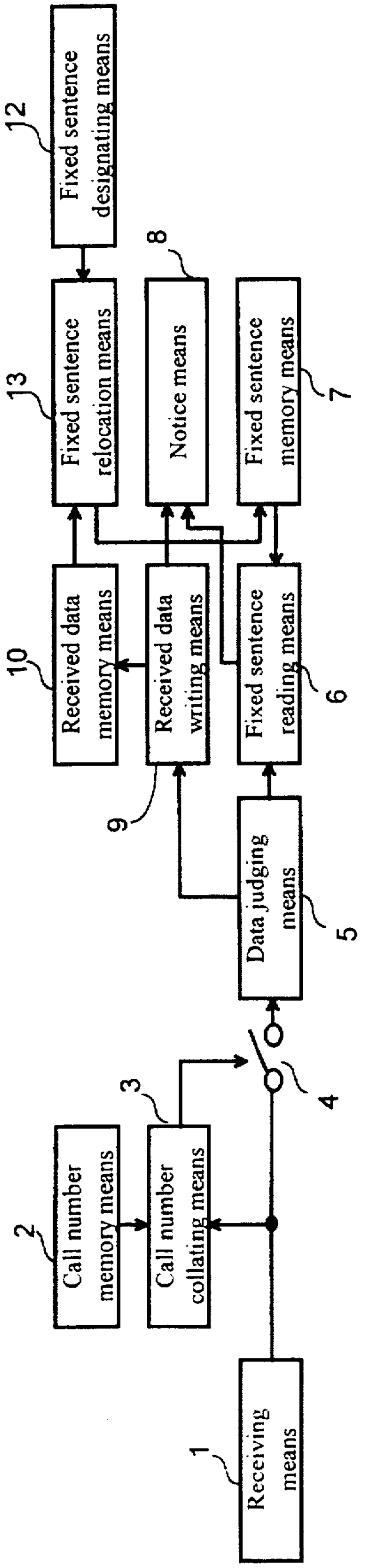
FIG. 5 is a block diagram showing a constitution of a radio selective call receiver in embodiment 2 of the invention.
Figure 6:
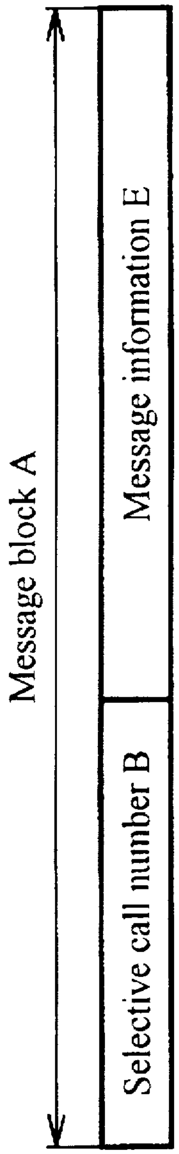
FIG. 6 PRIOR ART
FIG. 6 is a simplified diagram of signal format transmitted from radio selective call base station in prior art, and embodiment 1 or 2 of the invention.

A second embodiment of the invention is described below while referring to the drawings. FIG. 5 is a block diagram showing a constitution of a radio selective call receiver in embodiment 2 of the invention. FIG. 6 is a simplified diagram of signal format transmitted by a radio selective call base station for the radio selective call receiver of the embodiment. The radio selective call base station modulates and transmits either a message block A consisting of selective call number B and message information E shown in FIG. 6 as one block, or a message block A consisting of selective call number B and fixed sentence number information C shown in FIG. 8 as one block.

In the exemplary embodiment of FIG. 5, the same constituent elements as those in the 1st embodiment shown in FIG. 1 or the conventional radio selective call receiver shown in FIG. 9 are identified with the same reference numerals, and their explanations are omitted.

In FIG. 5, the receiving means 1 receives the signal transmitted by the radio selective call base station (not shown), and demodulates the content of the message block A so as to be recognized in each block. The data received and demodulated in the receiving means 1 is issued into the call number collating means 3. The data is also issued to the message acquisition switch 4 which is in an invalid state (open state). The call number collating means 3 compares and collates the selective call number B of the demodulated data and the call number initially stored in the call number memory means 2, and when both numbers match, the message acquisition switch 4 is made valid (closes), so that the demodulated data may be fed into the data judging means 5. The data judging means 5 judges the type of the data depending on whether the data succeeding the selective call number B is fixed sentence number information C or message information E.

For example, in the case of fixed sentence number information shown in FIG. 8 transmitted from the radio selective call base station, the data judging means 5 judges the data to be a fixed sentence, and the demodulated data is delivered to the fixed sentence reading means 6. The fixed sentence reading means 6 reads the fixed sentence data indicated by the input fixed sentence number information from the fixed sentence memory means 7, and further displays and notifies the user in the notice means 8.

Figure 7:
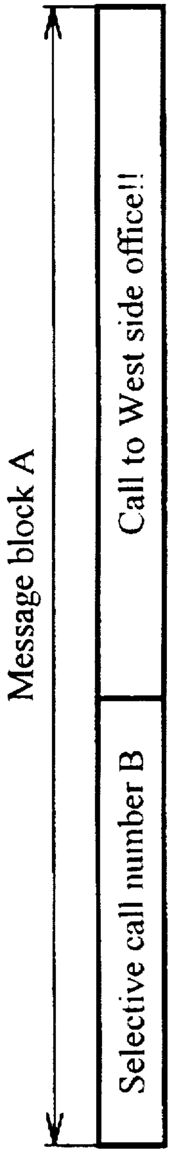
FIG. 7 PRIOR ART
FIG. 7 is a diagram showing an example of content of signal format transmitted by the same radio selective call base station.

On the other hand, when the radio selective call base station transmits message information as shown in FIG. 7, the data judging means 5 delivers the data in to the received data writing means 9, and the received data writing means 9 writes the received data into the received data memory means 10, and further displays and notifies the user in the notice means 8.

Incidentally, when the user of the radio selective call receiver wants the received message information to change a fixed sentence, a fixed sentence number is designated by fixed sentence designating means 12. The fixed sentence designating means 12 issues the designated fixed sentence number information signal to fixed sentence relocation means 13. The fixed sentence relocation means 13 relocates and stores the message information already stored in the received data memory means 10 into the position of the fixed sentence memory means 7 indicated by the designated fixed sentence number information signal. For example, when the user receives the message information shown in FIG. 7 and wants to change this message information into a fixed sentence of fixed sentence number 03, the user designates "03" by the fixed sentence designating means 12. Consequently, the designated fixed sentence number information signal "03" is fed into the fixed sentence relocation means 13, and "Call to West side office!!" stored in the received data memory means 10 is relocated to the position of "03" of the fixed sentence memory means 7 as shown in FIG. 4.

Thus, according to the embodiment, when the received message information is designated by the fixed sentence designating means 12 by the user, the received message information in the received data memory means 10 is relocated in the fixed sentence memory means 7 as fixed sentence information by the fixed sentence relocation means 13. Thus, the relocated fixed sentence information can be read out by the fixed sentence reading means 6 in the same way as the conventional fixed sentence, so that the fixed sentence can be altered or added by the user.

In the above description of the exemplary embodiment, the data judging means 5 judges whether the data is a fixed sentence number information of the received message block or message information, but it may also be judged by a judging information by setting a judging information of whether fixed sentence reading message information or not in the message block.

In the invention, therefore, if the user of the radio selective call receiver wishes to set arbitrary fixed sentence information, the information transmitted from the radio selective call base station is stored in the fixed sentence memory means, and thereafter when the stored fixed sentence number is received, the stored fixed sentence data information can be provided to the notice means. Hence, the user can newly add or alter arbitrary fixed sentences, so that the radio selective call receiver suited to the manner of use of the user can be realized.

The invention may be also modified further. For example, in the description of the foregoing exemplary embodiments, the data judging means 5 judges whether the fixed sentence number information of the received message block or the message information, but it may be also judged by judging information by setting judging information of whether fixed sentence reading message information or not in the message block. Therefore, all modified examples existing in the true spirit and scope of the invention are included in the scope of claims.

What is claimed:

1. A radio selective call receiver for use with a radio selective call base station for receiving and demodulating a selective call number and data accompanied by said selective call number, and displaying a message according to said data when said received selective call number and a preset self-selective call number match, comprising:

receiving means for receiving and demodulating received information consisting of at least one of:

a) the selective call number;

b) fixed sentence number information; and c) fixed sentence data information accompanied by the fixed sentence number information, of the signals transmitted by the radio selective call base station;

fixed sentence memory means for storing said fixed sentence data information together with said fixed sentence number information;

data judging means for determining whether to write or read the fixed sentence data information, or character message information, from the received information;

fixed sentence writing means for storing said received fixed sentence data information at a position indicated by said received fixed sentence number information into said fixed sentence memory means when determined to be a writing of the fixed sentence by said data judging means; and fixed sentence reading means for reading said stored fixed sentence data information from said fixed sentence memory means at the position indicated by said received fixed sentence number information when determined to be a reading of a fixed sentence by said data judging means.

2. A radio selective call receiver for use with a radio selective call base station for receiving and demodulating a selective call number and data accompanied by said selective call number, and displaying a message according to said data when said received selective call number and a preset self-selective call number match, comprising:

receiving means for receiving and demodulating signals transmitted by the radio selective call base station into data;

fixed sentence memory means for storing fixed sentence data together with a fixed sentence number;

received data memory means for storing received data;

data judging means for determining whether said data is signal fixed sentence data or character message information;

fixed sentence reading means for reading the stored fixed sentence data from said fixed sentence memory means at an indicated location when said data judging means determines the data to be a fixed sentence;

received data writing means for writing said received character message information into said received data memory means when said data judging means determines the data to be character message information;

fixed sentence designating means for:

a) designating said received character message information as fixed sentence; and b) designating the fixed sentence number for the data stored in said received data memory means after said data has been stored in said received data memory means; and fixed sentence relocation means for at least one of relocating and restoring the data stored in said received data memory means in the location of said fixed sentence memory means indicated by the fixed sentence number designated by said fixed sentence designating means when the fixed sentence is designated by said fixed sentence designating means.

3. A radio selective call receiver for use with a radio selective call base station comprising:

table means, including a plurality of fixed sentence messages, for mapping each of a plurality of fixed sentence numbers to a respective one of said fixed sentence messages, receiving means for receiving from the radio selective call base station a signal containing a) a fixed sentence number and b) a fixed sentence message if said fixed sentence message is included in said signal;

mapping means for mapping said fixed sentence number as one of said plurality of fixed numbers to said respective one of said plurality of fixed sentence messages if said fixed sentence number is one of said fixed sentence numbers mapped by said table;

means for storing said fixed sentence message as one of said plurality fixed sentence messages in said table if a) said fixed sentence message is included in said signal; and b) said fixed sentence message is absent from said table; and display means for displaying said respective one of said fixed sentence messages corresponding to said fixed sentence number contained in said signal.

4. A radio selective call receiver according to claim 3, wherein said receiving means receives a selective call number in said signal and said display means displays said respective one of said fixed sentence messages only if said selective call number corresponds to said receiver.

5. A method of displaying a fixed sentence message, comprising the steps of:

receiving from a radio selective call base station a signal containing a) a fixed sentence number and b) a fixed sentence message if said fixed sentence message is included in said signal;

determining if said fixed sentence number is one of a plurality of fixed sentence numbers each mapped to a respective one of a plurality of fixed sentence messages;

mapping said fixed sentence number as one of said plurality of fixed numbers to said respective one of said plurality of fixed sentence messages if said fixed sentence number is one of said fixed sentence numbers which are mapped;

storing said fixed sentence message as one of said plurality fixed sentence messages if a) said fixed sentence message is included in said signal; and b) said fixed sentence message is absent from said mapping; and displaying said fixed sentence message based upon said mapping.

6. A method according to claim 5, further comprising the step of receiving a selective call number in said signal and displaying said respective one of said fixed sentence messages only if said selective call number corresponds to said receiver.

* * * * *